United States Patent [19]

Reifenberg et al.

[11] 3,708,549
[45] Jan. 2, 1973

[54] STANNANE AS A REDUCING AGENT

[75] Inventors: Gerald H. Reifenberg, Hightstown; William J. Considine, Somerset, both of N.J.

[73] Assignee: M&T Chemicals Inc., New York, N.Y.

[22] Filed: June 24, 1970

[21] Appl. No.: 59,839

Related U.S. Application Data

[62] Division of Ser. No. 742,164, July 3, 1968.

[52] U.S. Cl. .......260/668 R, 260/617 C, 260/618 H, 260/638 B, 260/666 A, 260/676 R
[51] Int. Cl. ................................................C07c 15/06
[58] Field of Search....................260/638 B, 618 H, 617 C, 666 A, 260/668 R, 676 R

[56] References Cited

UNITED STATES PATENTS

| | | | |
|---|---|---|---|
| 2,997,485 | 8/1961 | Kuivila et al. | 260/618 H X |
| 3,072,698 | 1/1963 | Hinckley | 260/638 B X |
| 3,184,492 | 5/1965 | Cole | 260/638 B UX |
| 3,244,752 | 4/1966 | Eschinasi | 260/638 B X |
| 3,281,218 | 10/1966 | Edwards et al. | 260/638 B X |
| 3,281,443 | 10/1966 | Hunt | 260/638 B X |
| 3,375,087 | 3/1968 | Gunderloy | 260/638 B X |
| 3,394,169 | 7/1968 | Davis | 260/638 B X |

*Primary Examiner*—Curtis R. Davis
*Attorney*—Kenneth G. Wheeless

[57] ABSTRACT

The method of this invention for reducing organic substrates comprises reacting as reactants stannane, $SnH_4$, and an organic substrate, maintaining said reactants together in a reaction mixture, and separating said reduced substrate from said reaction mixture.

2 Claims, No Drawings

STANNANE AS A REDUCING AGENT

This application is a divisional application of Ser. No. 742,164, filed on July 3, 1968.

This invention relates to a novel method for reducing organic substrates. More specifically this invention relates to a process for preparing alcohols, amines, and hydrocarbons. The method of this invention for reducing organic substrates comprises reacting as reactants stannane, $SnH_4$, and an organic substrate, maintaining said reactants together in a reaction mixture, and separating said reduced substrate from said reaction mixture.

The method of this invention for reducing organic substrates comprises reacting as reactants stannane, $SnH_4$, and a compound of the formula $$R-\underset{\underset{Y}{|}}{A}-Z$$

in which A is selected from the group consisting of carbon and nitrogen, Z and Y are selected from the group consisting of oxygen, halogen, hydrogen, and R' such that only one of Z and Y is R' or hydrogen, wherein R and R' are hydrocarbon radicals free of olefinic and acetylenic unsaturation, selected from the group consisting of alkyl, alkaryl, aralkyl, aryl, and cycloalkyl, maintaining said reactants together in a reaction mixture, and separating said reduced organic substrates from said reaction mixture.

According to another of its aspects, the method of this invention for preparing alcohols, amines, and hydrocarbons comprises reacting as reactants tin tetrahalide in the presence of a lithium aluminum hydride reducing agent to produce stannane, $SnH_4$, reacting as reactants said stannane, $SnH_4$, and a compound $$R-\underset{\underset{Y}{|}}{A}-Z$$

in which A is selected from the group consisting of carbon and nitrogen, Z and Y are selected from the group consisting of oxygen, halogen, hydrogen and R' such that only one of Z and Y is R' or hydrogen wherein R and R' are hydrocarbon radicals free of olefinic and acetylenic unsaturation selected from the group consisting of alkyl, alkaryl, aralkyl, aryl, and cycloalkyl, maintaining said reactants together in a reaction mixture, and separating said reduced organic substrates from said reaction mixture.

According to one of its aspects, the method of this invention for preparing alcohols, ROH, comprises reacting as reactants stannane, $SnH_4$, and a compound selected from aldehydes and ketones of the formula $$R-\underset{\underset{}{\overset{O}{\|}}}{C}-Z$$

wherein Z is selected from the group consisting of hydrogen and R', wherein R and R' are hydrocarbon radicals free of olefinic unsaturation selected from the group consisting of alkyl, alkaryl, aralkyl, aryl, and cycloalkyl radicals, maintaining said reactants together in a reaction mixture, and separating the alcohol from said reaction mixture.

In accordance with another of its more circumscribed aspects, the method of this invention for preparing organic amines, $RNH_2$, comprises reacting as reactants stannane, $SnH_4$, and a compound of the formula $RNO_2$ wherein R is a hydrocarbon radical, free of olefinic and acetylenic unsaturation, selected from the group consisting of alkyl, alkaryl, aralkyl, aryl, and cycloalkyl radicals, maintaining said reactants together in a reaction mixture, and separating $RNH_2$ from said reaction mixture.

Another aspect of the method for this invention for preparing hydrocarbons, RH comprises reacting as reactants stannane, $SnH_4$, and a compound of the formula RX wherein X is a halogen selected from the group consisting of chlorine, bromine and iodine and R is a hydrocarbon radical, free of olefinic and acetylenic unsaturation, selected from the group consisting of alkyl, alkaryl, aralkyl, aryl, and cycloalkyl radicals, maintaining said reactants together in a reaction mixture, and separating RH from said reaction mixture.

In the foregoing compounds R and R' may each be a hydrocarbon radical preferably selected from the group consisting of alkyl, cycloalkyl, aralkyl, aryl, alkaryl, including such radicals when inertly substituted. When R or R' is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e., having less than about 8 carbon atoms, i.e., octyls and lower. When R is cycloalkyl, it may typically be cyclopentyl, cyclo-hexyl, cycloheptyl, cyclooctyl, etc. When R is aralkyl, it may typically be benzyl, β-phenylethyl, ν-phenylpropyl, β-phenylpropyl, etc. When R is aryl, it may typically be phenyl, etc. When R is alkaryl, it may typically be tolyl, xylyl, p-ethylphenyl, p-nonylphenyl, etc. R may be inertly substituted, e.g., may bear a nonreactive substituent such as alkyl, aryl, cycloalkyl, aralkyl, alkaryl, alkenyl, ether, ester, etc. Typical substituted alkyls include 2-ethoxyethyl, carboethoxymethyl, etc. Substituted cycloalkyls include 4-methylcyclohexyl, etc. Inertly substituted aryl includes anisyl, biphenyl, etc. Inertly substituted aralkyl includes p-phenylbenzyl, p-methylbenzyl, etc.

This invention comprises the reduction of organic compounds by reactively contacting said compounds with stannane, $SnH_4$, and recovering said compounds in their reduced state. Illustrative reactions include those in which ketones, aldehydes, nitro compounds, alkyl halides, aryl halides, cycloalkyl halides, and organometallic halides are reduced. Acetone when reacted with stannane, $SnH_4$, is reduced to isopropyl alcohol; benzaldehyde is reduced to benzyl alcohol; nitrobenzene is reduced to aniline; and 2-nitropropane is reduced to isopropylamine.

The ratio of moles of stannane, $SnH_4$, per substrate functional group to be reduced should be at least 0.5 when ketones or aldehydes are to be reduced; at least 1.5 when nitro functional groups are to be reduced; and at least 0.25 when halogen groups are to be reduced.

Benzaldehyde is reduced by stannane, $SnH_4$, to benzyl alcohol in quantitative yields according to the equation:

$$SnH_4 + 2C_6H_5\overset{O}{\overset{\|}{C}}H \longrightarrow Sn + 2C_6H_5CH_2OH$$

Stannane, $SnH_4$, may be prepared by reacting tin tetrachloride, tin tetrabromide or tin tetraiodide with lithium aluminum hydride in the presence of a nitrogen atmosphere containing about 0.1 percent oxygen. The reactions of this invention are preferably carried out under inert atmosphere, e.g., nitrogen containing approximately 0.1 percent by weight, oxygen since stannane, $SnH_4$, is relatively unstable. In preparing stannane, $SnH_4$, by the reduction of tin tetrahalide, the tin tetrahalide may be reacted with lithium aluminum hydride at a temperature ranging from −200° C to 20° C. The temperature, initially, is preferably near −200° C and is preferably elevated slowly to −70° C to avoid decomposing stannane. It is noted that the melting point of stannane, $SnH_4$, is −146° C and the boiling point is −52.5° C.

In reducing tin tetrahalide to stannane, the molar ratio of lithium aluminum hydride to tin tetrahalide should be greater than unity, preferably 2 or 3 to 1.

During the preparation of stannane the following typical reaction may occur: $SnCL_4 + LiAlH_4 \rightarrow SnH_4 + LiAlCl_4$.

In practice of the process of this invention, the reactants are mixed together to form the reaction mixture. It may be desirable to use in the reaction mixture an inert diluent. Solvents or diluents suitable as the reaction medium of this invention include aliphatic hydrocarbons, aromatic hydrocarbons and ethers. The foregoing may contain carboxylic esters, carboxylic amides, and nitrile groups as substituents. Aromatic amino groups, but not aliphatic amino groups, may also be present as substituents. Among the suitable solvents are diethyl ether and tetrahydrofuran. The substrate to be reduced, e.g., benzaldehyde, is charged into a reaction vessel or trap that may be preferably immersed in liquid nitrogen, the liquid nitrogen exhibiting a temperature of approximately −195° C. Stannane, $SnH_4$, is then added to the reaction vessel or trap, after which the temperature may be adjusted slowly and incrementally, to room temperature, approximately 20° C. The reaction temperature may be adjusted to a higher temperature, circa. −78° C, by transferring the reaction vessel or trap, from the liquid nitrogen bath (at −195° C) to a dry ice-acetone bath at approximately −78° C; and thereafter, to an ice-methanol bath at −22° C. After removing the reaction mixture from the ice-methanol bath the temperature may be allowed to rise to room temperature. Unreacted stannane, $SnH_4$, may be collected in conventional traps outside the reaction zone. The reaction mass may be filtered to separate the product.

Practice of this invention may be observed from the following illustrative examples.

EXAMPLE 1

The reactants 6.5 grams (0.025 mole) of tin tetrachloride and 4.8 grams (0.125 mole) of lithium aluminum hydride were charged to a 250 milliliter 2-necked flask immersed in a liquid nitrogen bath at −196° C. The atmosphere surrounding the system was nitrogen containing 0.1 percent oxygen. The temperature of the reaction vessel was slowly increased and at −62° C ebullition of gas was observed. The temperature, thereafter, was slowly and incrementally increased to room temperature, 27° C, whereupon the stannane, $SnH_4$, product was collected in traps. The stannane product exhibited a weight of 2.85 grams (0.023 mole) and an 87.2 percent yield.

To a vessel or trap, immersed in an ice-water bath (0° C) was added 51.2 grams (0.48 mole) of benzaldehyde. Stannane 2.85 grams (0.023 mole) at −195° C from an adjoining, connected trap was slowly bubbled through the benzaldehyde during a 150 minute time interval. At the termination of the reaction period, the resulting mixture was filtered to remove tin metal. The product, benzyl alcohol, exhibited a weight of 2.82 grams. The identification of the product was confirmed by vapor phase chromatographic analysis.

EXAMPLE 2

The preparation of isopropyl alcohol from acetone.

The procedure of Example 1 was followed except that the reaction vessel was charged with 2.75 grams of stannane, $SnH_4$, and 21.7 grams of acetone. The product, isopropyl alcohol, exhibited a weight of 1.01 grams (0.017 mole). The identification of the product was confirmed by vapor phase chromatographic analysis.

EXAMPLE 3

The preparation of isopropylamine from 2-nitropropane.

The procedure of Example 1 was followed except that the reaction vessel was charged with 2.7 grams of stannane, $SnH_4$, and 26.0 grams (0.29 mole) of 2-nitropropane.

The reaction trap was in a liquid nitrogen bath, exhibiting a temperature of −195° C. The temperature of the reaction mass was then adjusted by sequentially transferring the reaction vessel from the liquid nitrogen bath at −195° C to a dry ice-acetone bath exhibiting a temperature of approximately −78° C and then to an ice-methanol bath at −22° C. The temperature of the reaction vessel was then allowed to rise to room temperature (26° C).

The total time period for the sequential temperature increases to be effected was 3.5 hours. The product, isopropylamine, exhibited a weight of 0.14 grams.

EXAMPLE 4

The preparation of aniline from nitrobenzene.

The procedure of Example 1 was followed except that the reaction vessel was charged with 2.65 grams (0.025 mole) of stannane, $SnH_4$, and 44.5 grams (0.36 mole) of nitrobenzene. The product, aniline, exhibited a weight of 0.31 grams. The identification of the product was confirmed by vapor phase chromatographic analysis.

EXAMPLE 5

The preparation of toluene from benzyl chloride.

The procedure of Example 3 was followed except that the reaction vessel was charged with 2.9 grams of stannane, and 38.0 grams (0.3 mole) of benzyl chloride. The product, toluene, exhibited a weight of 3.0 grams. The identity of the product was confirmed by vapor phase chromatographic analysis.

Although this invention has been illustrated by reference to specific examples, modifications thereof which are clearly with in the scope of the invention will be apparent to those skilled in the art.

We claim:

1. A method for preparing RH hydrocarbons which comprises reacting as reactants stannane, $SnH_4$, and a compound of the formula RX wherein X is a halogen selected from the group consisting of chlorine, bromine, and iodine, and R is a hydrocarbon radical, free of olefinic and acetylenic unsaturation, selected from the group consisting of alkyl, alkaryl, aralkyl, aryl, and cycloalkyl radicals, maintaining said reactants together in a reaction mixture, and separating said hydrocarbon from said reaction mixture.

2. The method of claim 1 in which the hydrocarbon is toluene.

* * * * *